US007792896B2

(12) United States Patent
Cohen et al.

(10) Patent No.: US 7,792,896 B2
(45) Date of Patent: Sep. 7, 2010

(54) HETEROGENEOUS TWO-PHASE COMMIT TEST ENGINE

(75) Inventors: David Alex Cohen, Poughkeepsie, NY (US); Evan Jennings, Kingston, NY (US); Mary Ellen Kerr, Stamford, CT (US); Surya Kumari L. Pericherla, Fishkill, NY (US); Gary Stuart Puchkoff, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 11/967,561

(22) Filed: Dec. 31, 2007

(65) Prior Publication Data

US 2009/0172153 A1    Jul. 2, 2009

(51) Int. Cl.
*G06F 15/16* (2006.01)
*G06F 7/00* (2006.01)

(52) U.S. Cl. ............... 709/201; 707/610; 707/635

(58) Field of Classification Search ............... 709/201, 709/217–219, 223, 224; 707/10, 201, 610, 707/635, 999.01, 999.201
See application file for complete search history.

(56) References Cited

U.S. PATENT DOCUMENTS

| | | | |
|---|---|---|---|
| 5,504,899 A * | 4/1996 | Raz | 707/10 |
| 5,680,610 A * | 10/1997 | Smith et al. | 707/10 |
| 6,044,398 A | 3/2000 | Marullo et al. | |
| 6,061,708 A * | 5/2000 | McKeehan et al. | 718/101 |
| 6,275,843 B1 * | 8/2001 | Chorn | 718/101 |
| 6,473,894 B1 | 10/2002 | Shrader et al. | |
| 6,839,647 B2 | 1/2005 | Volkov et al. | |
| 7,093,073 B2 | 8/2006 | Truty | |
| 2003/0074423 A1 | 4/2003 | Mayberry et al. | |
| 2005/0015425 A1 * | 1/2005 | Kumar et al. | 709/200 |
| 2005/0015491 A1 | 1/2005 | Koeppel | |
| 2005/0071439 A1 | 3/2005 | Bookman et al. | |
| 2005/0251487 A1 | 11/2005 | Evans et al. | |
| 2006/0212823 A1 | 9/2006 | Bhagat et al. | |
| 2006/0265475 A9 | 11/2006 | Mayberry et al. | |

OTHER PUBLICATIONS

Tsai et al., "Scenario-Based Object-Oriented Testing Framework," IEEE Computer Society, Proceedings of the Third International Conference On Quality Software (QSIC '03) 0-7695-2015-4/03, 8 pages.

* cited by examiner

*Primary Examiner*—Yemane Mesfin
(74) *Attorney, Agent, or Firm*—Stephen Bongini; Fleit Gibbons Gutman Bongini & Bianco PL

(57) ABSTRACT

A computer-implemented method, information processing system, and computer program storage product validate a two-phase commit process. First information is received that indicates a plurality of web services to be tested. Each of the web services are associated with a different resource manager. Second information is received that indicates a plurality of application servers for performing the web services. A global transaction is created that includes a plurality of transactions based on the first information that was received. A two-phase commit process is initiated at one of the application servers for performing the global transaction. After the two-phase commit process has ended, results of the global transaction that include information regarding each of the transactions within the global transaction are displayed.

20 Claims, 9 Drawing Sheets

HETEROGENEOUS TWO-PHASE COMMIT TEST ENGINE

FIELD OF THE INVENTION

The present invention generally relates to the field of global transactions within a computing environment, and more particularly relates to validating two-phase commit processes for completing global transactions.

BACKGROUND OF THE INVENTION

Two-phase commit protocols are generally used in computing environments to provide an automatic recovery mechanism when a system or media failure occurs during execution of a transaction. Two-phase commit protocols such as Open Group's XA protocol ensure that all participating processing nodes (e.g., application servers or database servers) receive and implement the same action (either to commit or to roll back a transaction), regardless of local or network failure.

Two-phase commit operations generally occur between transaction managers such as WebSphere® and WebLogic®, and resource managers such as DB2®, Oracle®, and SQL Server®. A resource manager is responsible for managing a part of a computer's shared resources (i.e., software entities can request access to a resource from time to time, using services that the resource manager provides). A transaction manager is responsible for managing global transactions, coordinating the decision to commit them or roll them back, and coordinating failure recovery.

Testing two-phase commit operations within a system allows administrators to determine if a two-phase commit protocol can be properly implemented in a system. However, current system testing environments and tools do not provide a mechanism to validate two-phased commit processing with heterogeneous resource managers being enlisted by Enterprise Java Beans ("EJBs") themselves or EJBs called by WebService endpoints.

SUMMARY OF THE INVENTION

In one embodiment, a method for validating a two-phase commit process is disclosed. The method includes receiving first information that indicates a plurality of web services to be tested. Each of the web services are associated with a different resource manager. Second information is received that indicates a plurality of application servers for performing the web services. A global transaction is created that includes a plurality of transactions based on the first information that was received. A two-phase commit process is initiated at one of the application servers for performing the global transaction. After the two-phase commit process has ended, results of the global transaction that include information regarding each of the transactions within the global transaction are displayed.

In another embodiment, an information processing for validating a two-phase commit process is disclosed. The information processing system includes a memory and a processor communicatively coupled to the memory. The information processing system further includes a test module that is communicatively coupled to the memory and the processor. The test module is adapted to receiving first information that indicates a plurality of web services to be tested. Each of the web services are associated with a different resource manager. Second information is received that indicates a plurality of application servers for performing the web services. A global transaction is created that includes a plurality of transactions based on the first information that was received. A two-phase commit process is initiated at one of the application servers for performing the global transaction. After the two-phase commit process has ended, results of the global transaction that include information regarding each of the transactions within the global transaction are displayed.

In yet another embodiment, a computer program storage product for validating a two-phase commit process is disclosed. The computer program storage product includes instructions for receiving first information that indicates a plurality of web services to be tested. Each of the web services are associated with a different resource manager. Second information is received that indicates a plurality of application servers for performing the web services. A global transaction is created that includes a plurality of transactions based on the first information that was received. A two-phase commit process is initiated at one of the application servers for performing the global transaction. After the two-phase commit process has ended, results of the global transaction that include information regarding each of the transactions within the global transaction are displayed.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION

The various embodiments of the present invention discussed below allow two-phased commit processing with heterogeneous resource managers being enlisted by Enterprise Java Beans ("EJBs") themselves or EJBs called by WebService endpoints. In one embodiment, various resource managers such as (but not limited to) DB2, IMS, CICS, and WebSphere MQ are enlisted in a global transaction comprising chained superior-subordinate requests across multiple JAX-WS web service calls. In another embodiment, the call chaining occurs across Remote Method Invocation over Internet Inter-Orb Protocol ("RMI/IIOP") calls between EJBs in a server as client configuration (also superior-subordinate).

In a preferred embodiment, a Web GUI front-end for a two-phase commit test engine enables a tester to dynamically configure combinations and sequences of chaining requests for the various resource managers. Options for either JAX-WS web service call chaining or EJB RMI call chaining are presented to the tester. In this embodiment, a pause function can also be utilized by a tester so that an enlisted transaction in a global transaction can be suspended. This allows precise failover testing to be performed (i.e., failing a specific system where the suspended transaction is located). After a unit of recovery has been re-dispatched on a recovery server, the transaction can then be resumed and verification automatically occurs to validate that the entire set of requests has completed properly. The two-phase commit test engine of this embodiment can also be ran under stress in a WebSphere clustered environment such that a large volume of work is being processed during a failover test and that all initiated test Web Service or EJB request chains execute to successful completion.

Operating Environment

Figure 1:
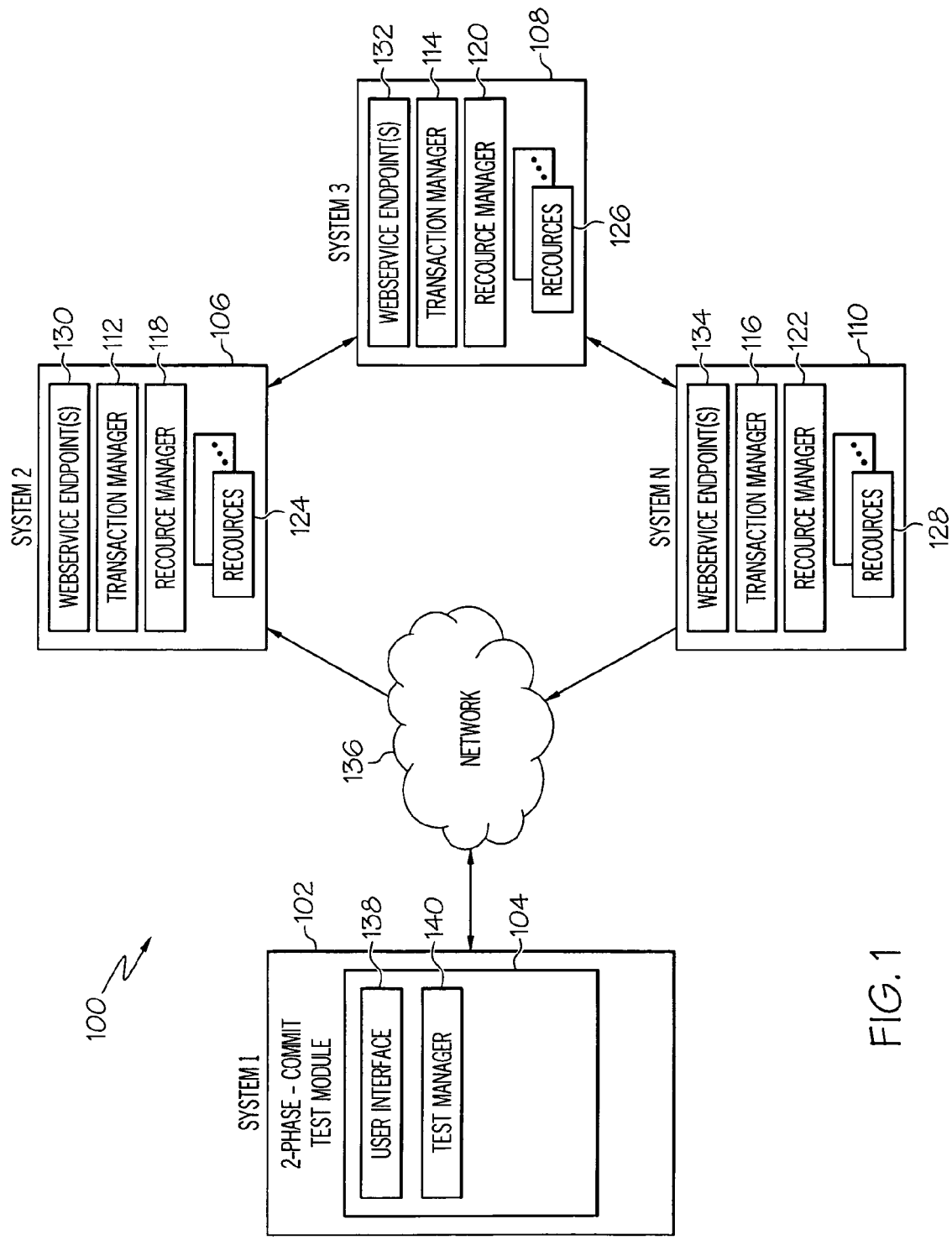
FIG. 1 is a block diagram illustrating an operating environment according to one embodiment of the present invention.

An operating environment 100 according to an embodiment of the present invention is illustrated in FIG. 1. As shown, one or more information processing systems 102 comprise a two-phase commit test module 104 for validating two-phase commit processing within the operating environment 100. The two-phase commit test module 104 presents an automated end-to-end testing of a two-system process without requiring the construction of a new test case and validation checker for each configuration.

In this embodiment, the two-phase commit processing being validated comprises heterogeneous resource managers that are enlisted by the business logic of EJBs themselves or EJBs called by WebService endpoints. The operating environment 100 of this embodiment also includes multiple systems 106, 108, and 110 such as (but not limited to) application servers (for simplicity, these systems 106, 108, and 110 are referred to below as application servers). In this embodiment, the two-phase commit test module 104 validates/tests two-phase commit processes on one or more of the application servers 106, 108, and 110. The two-phase test module 104 can also reside on one of the application servers 106, 108, and 110.

At least one of the application servers 106, 108, and 110 is communicatively coupled to the two-phase commit test system 102 via a network 136. The application servers 106, 108, and 110 are also communicatively coupled to one another. Each application server 106, 108, and 110 in this embodiment includes a transaction manager 112, 114, and 116, one or more resource managers 118, 120, and 122, and a set of resources 124, 126, and 128. In this embodiment, each of the application servers 106, 108, and 110 also includes a web service endpoint 130, 132, and 134, which is a referenceable entity such as (but not limited to) a processor or resource that can receive web service messages.

Examples of a transaction manager 112, 114, and 116 are (but not limited to) WebSphere® and WebLogic®. Examples of a resource manager are (but not limited to) DB2®, Oracle®, and SQL Server®. The application server 106, 108, and 110, which can be (but is not limited to) a WebSphere Application Server, uses a transaction manager 112, 114, and 116 (also known as an external coordinator) to communicate with the application components (e.g., Java servlets or Enterprise Java Beans) and the resource managers 118, 120, and 122 (e.g., IMS or DB2®) through resource adapters (e.g., IMS Connector for Java) to coordinate a transaction.

If a transaction manager coordinates a transaction, that transaction is considered a global transaction. A global transaction is multiple operations grouped into a single transaction, or a single unit of work, in which all changes within the transaction are either fully completed or fully rolled back. Stated differently, a global transaction is indivisible or "atomic". If a transaction manager 112, 114, and 116 coordinates a transaction with more than one resource manager 118, 120, and 122, the transaction manager 112, 114, and 116 uses a two-phase commit protocol. For example, a user wants to transfer money from a savings account to a checking account. If the savings account information resides on a separate resource manager from the checking account information (e.g., the saving account resides on IMS and the checking account resides on DB2), the transaction manager 112, 114, and 116 in the application server 106, 108, and 110 (WebSphere Application Server) helps the application to coordinate the changes between IMS and DB2 transparently using two-phase commit processing. Specifically, the transaction manager works with an IMS resource adapter to coordinate the changes in IMS.

As discussed above, a two-phase commit process handles system and media failures in such a way that data integrity is preserved across all processing nodes. Two-phase commit operations generally occur between transaction managers and resource managers. In a first phase of a two-phase commit process, a transaction manager asks a resource manager to prepare to commit transaction branches (i.e., resource manager 118 is queried to see if it can guarantee the ability to commit a transaction branch). If the resource manager 118 is able to commit, it records any pertinent information that is needed, and then replies affirmatively. A negative reply indicates failure of a transaction. After making a negative reply and rolling back its work, the resource manager 118 can discard its knowledge of the transaction branch.

In a second phase of a two-phase commit test process, the transaction manager 112 issues the resource manager 118 an actual request to commit or roll back the transaction branch. Prior to issuing requests to commit, the transaction manager 112 records decisions to commit, as well as a list of all involved resource managers (in this case, resource manager 118). The resource manager 118 either commits or rolls back changes to resources and then returns status to the transaction manager 112. The transaction manager 112 can then delete entries related to the global transaction.

In one embodiment, the two-phase commit test module 104 comprises a user interface 138. The user interface of this embodiment is a web service client 138 that allows a user to dynamically configure combinations and sequences of chaining requests for the various resource managers 118, 120, and 122 such as (but not limited to) DB2, IMS, CICS, and WebSphere MQ. The user interface/web service client 138 allows a user to dynamically configure JAX-WS web service call chaining and EJB RMI call chaining. The user interface/web service client 138 is discussed in greater detail below. The two-phase commit test module 104 of this embodiment also includes a test manager 140 for receiving and managing user configuration data. The test manager 140 also manages and monitors the two-phase commit testing being performed across the application servers 106, 108, and 110 based on the received user configuration data. The test manager 140 is discussed in greater detail below.

Heterogeneous Two-Phase Commit Process Validation

Figure 2:
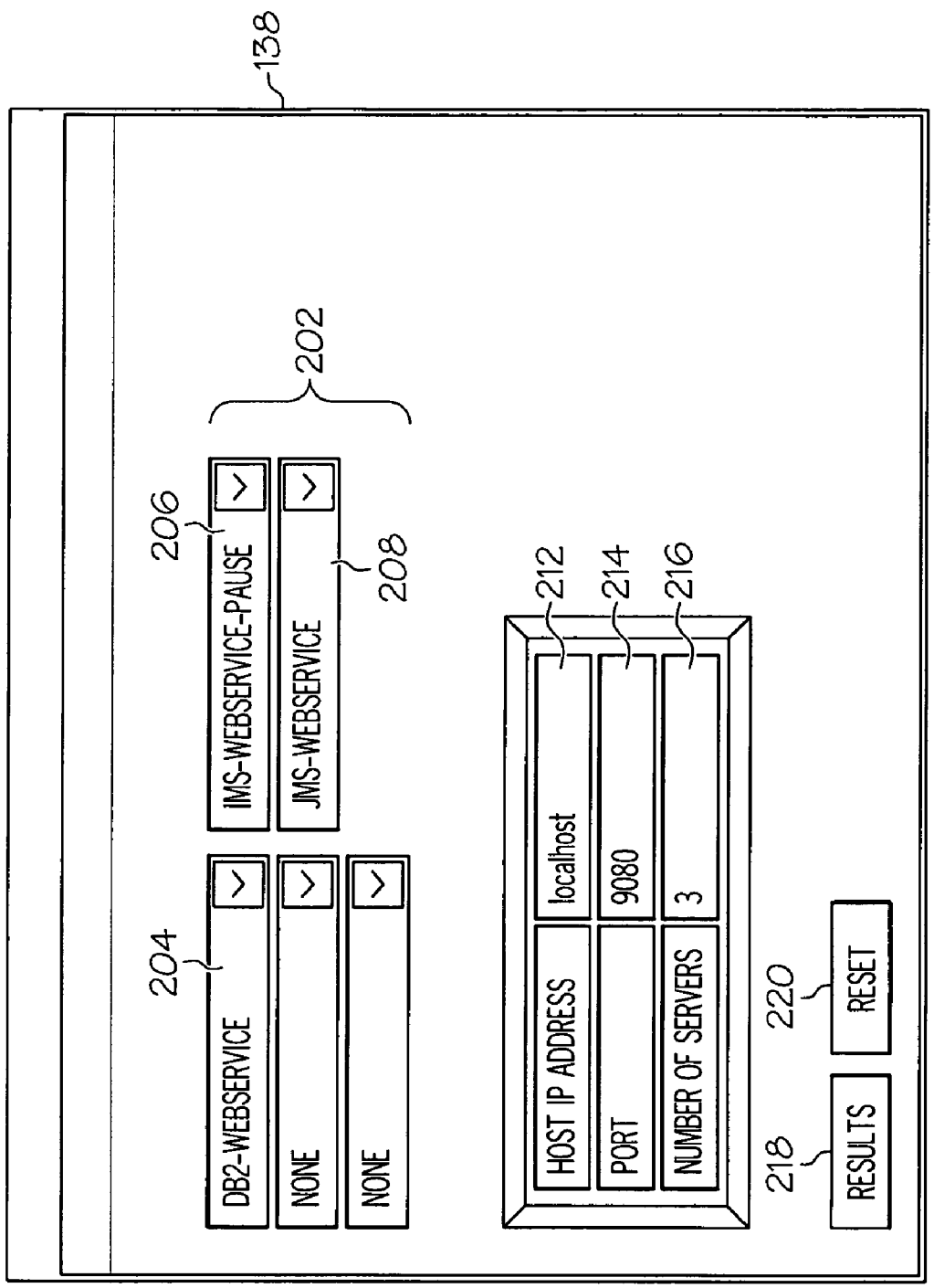
FIG. 2 illustrates a user interface for testing a two-phase commit process according to one embodiment of the present invention.

As discussed above, embodiments of the present invention validate two-phased commit processing with heterogeneous resource managers being enlisted by EJBs themselves or EJBs called by WebService endpoints. FIG. 2 shows one exemplary embodiment of the user interface 138 in the form of a web service client that that allows a user to dynamically configure combinations and sequences of chaining requests for various heterogeneous resource managers 118, 120, and 122 for testing a two-phase commit process. The user interface/web service client 138 presents an interface for the user to dynamically configure JAX-WS web service call chaining and/or EJB RMI call chaining.

In the example of FIG. 2, the user interface/web service client 138 is used for dynamically configuring JAX-WS web service call chaining. In this example, the application servers 106, 108, and 110 are WebSphere Application Servers implementing WS-AT ("Web Services Atomic Transaction"). WS-AT provides transactional support for Web service application requests that are compliant with JSR 109 and made using SOAP/HTTP. WS-AT allows distributed Web Service applications, and the resources they use, to take part in distributed global transactions.

The user interface/web service client 138 of this embodiment includes fields 202 that allow the user to select a sequence of web services to be called within an atomic transaction (i.e., global transaction). In other words, the fields 202 allow the user to configure combinations and sequences of chaining requests. For example, in the example illustrated in FIG. 2, the user has selected a first sequence 204 of DB2-WebService, a second sequence 206 of IMS-WebService-Pause, and a third sequence 208 of JMS-WebService. These sequences of the transaction combine to create an atomic transaction. A pause option, such as that selected in the IMS-WebService-Pause sequence 206, is an option that suspends an action to allow the service to be failed. This is useful for testing the recovery function of a two-phase commit operation, which is discussed in greater detail below.

The user interface/web service client 138 also includes a "Host IP Address" field 212 that allows the user to specify the IP address of the host. In the example, of FIG. 2, the host IP address is "localhost", which is a specialized server address that indicates the address of the machine that is local to where the application is running. The user interface/web service client 138 also includes a "Port" field 214. The "Port" field 214 allows the user to enter the port number of the first application server to be used in the two-phase commit testing process. In the example, of FIG. 2, the lowest port number "9080" has been entered.

A "Number of Servers" field 216 allows the user to enter the number of servers to be used during the two-phase commit testing process. The port number provides the starting port number, and the number of servers provides the total number of sequentially numbered ports to be used. In the example of FIG. 2, the user has configured the two-phase commit test module 104 to test two-phase commit process using three heterogeneous resource managers on three different application servers, starting with port 9080. Thus, this identifies the ports to be used as ports 9080, 9081, and 9082.

A first widget 218 allows the user to submit the displayed configuration to initiate the testing process and eventually get the results of the testing process. A second widget 220 allows the user to reset all of the fields 202, 212, 214, and 216. The configuration of the user interface/web service client 138 shown in FIG. 2 is only one example for the purposes of illustration, and is not meant to limit the present invention.

Figure 3:
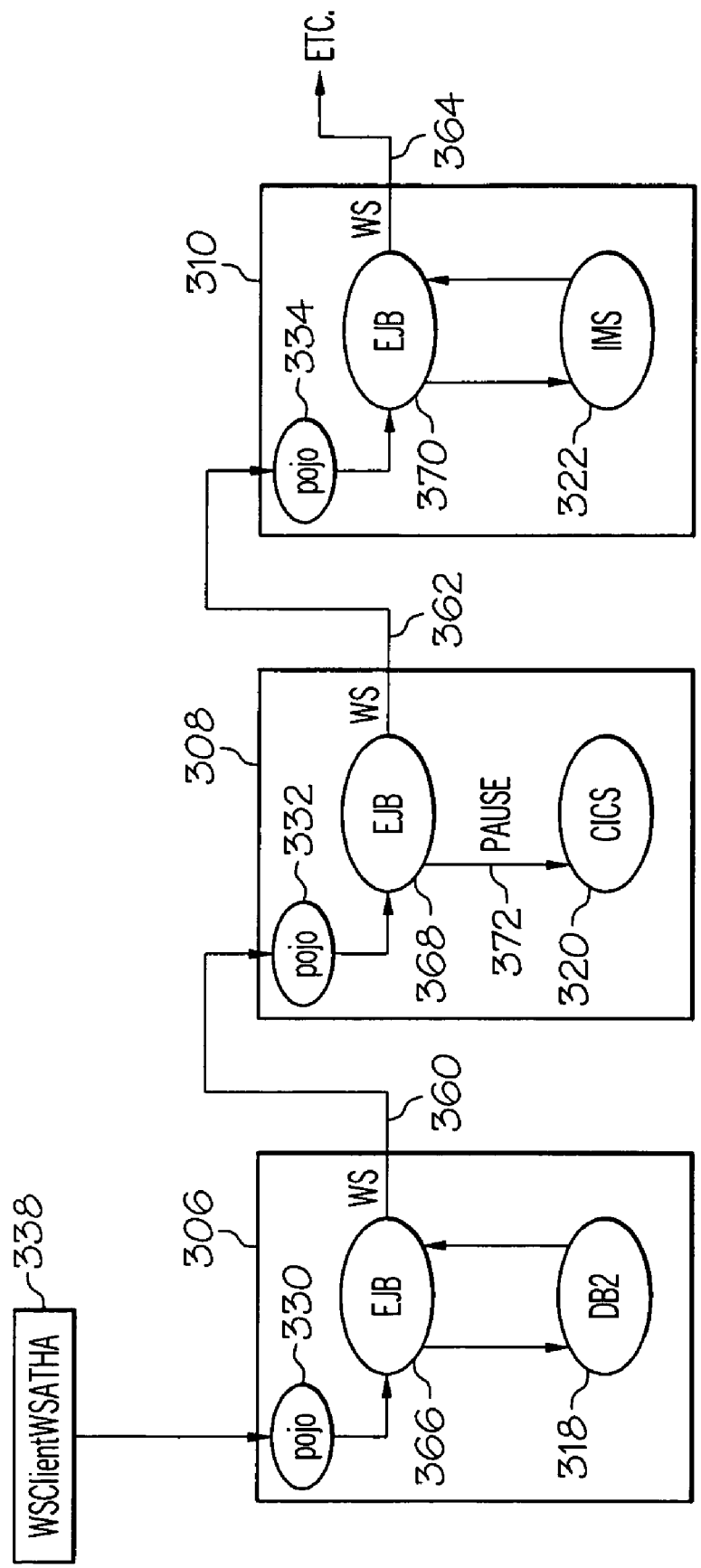
FIG. 3 is a transaction flow between application servers for validating a two-phase process submitted by a user according to one embodiment of the present invention.

FIG. 3 is a block diagram illustrating an exemplary transaction flow between application servers after the user submits a two-phase commit test configuration. In this particular example, web services 360, 362, and 364 each act as a web service client while invoking a new web service call. In this embodiment, the web service endpoints 330, 332, and 334 (shown as "POJO", Plain Old Java Objects, modules) are Java Beans that call their respective EJBs 366, 368, and 370. The EJBs 366, 368, and 370 enlist various resource managers 318, 320, and 322 (CICS, IMS, DB2, and MQSeries in the example of FIG. 3). The EJBs are Container Managed Transactions ("CMT") and have TX_REQUIRED transaction attributes. If the transaction attribute is Required, the container ensures that the EJBs method will always be invoked with a transaction. Subsequent methods will be included in the transaction if they have transaction types of Required, Supports, and Mandatory.

Also, Policy Sets of type WS-Transaction are attached to the service providers and the service clients to enable the web services to participate in atomic transactions. The Transaction context propagates across the web service calls so that all of the transactions become a part of one global transaction. In this embodiment, a "wsimport" tool generates the web service artifacts for the JAX-WS web service clients, and a "wsgen" tool generates the web service artifacts to enable a service endpoint to be called by a web service client in the JAX-WS runtime. The input to the wsgen tool is a java implementation class with @WebService annotation of javax.jws.WebService. The web service endpoint interface is specified in the annotation of the implementation class which defines the public method that the web service client calls. The methods in the endpoint interface are annotated with @WebMethod. The input and output parameters of the methods are JAXB compatible.

Based on the selection of the sequence from the web interface, the user interface/web service client 338 issues a web service call to the first component 330 from the selection. In the example of FIG. 2, the first selection was DB2-WebService. The web service calls its respective EJB 366, which connects to the resource manager 318. As discussed above, the EJB 366 is defined as TX_REQUIRED and starts the global transaction. The global transaction context is propagated to the rest of the web services which have WS-Transaction policy sets enabled. Once connected to the resource manager 318, the EJB 366 performs its business logic utilizing the services of the resource manager 118.

Data validation is then performed. For example, the transaction manager 112 associated with the application server 106 requests a PREPARE command and a CONFIRM command to be confirmed by the resource manager 318 to verify that the operation was successful. The data validation information can then be sent to the two-phase commit module 104 or aggregated with data validation from subsequent transactions at the other servers. The aggregated data can then be sent to the two-phase commit test module 104. The EJB 366 becomes a web service client and then issues a call to the next web service 332 in the sequence received from the user. The test manager 140 then performs a "checksum" type validation back at the client to make sure all transactions within the global transaction ran successfully.

The EJB 366 then becomes a web service client and issues a call to the next web service 332 in the sequence received from the user. In this example, the web service requires the CICS resource manager 320 and a pause (which suspends the enlisted transaction of the global transaction). This allows precise failover testing to be performed (i.e., failing a specific system where the suspended transaction is located). The two-phase commit test module 104, in this situation, determines whether a unit of recovery properly re-dispatches on a recovery server. Also, if the error is non-recoverable, the two-phase commit test module 104 ensures that the environment being tested properly performs a rollback of all services within the atomic transaction.

Figure 4:
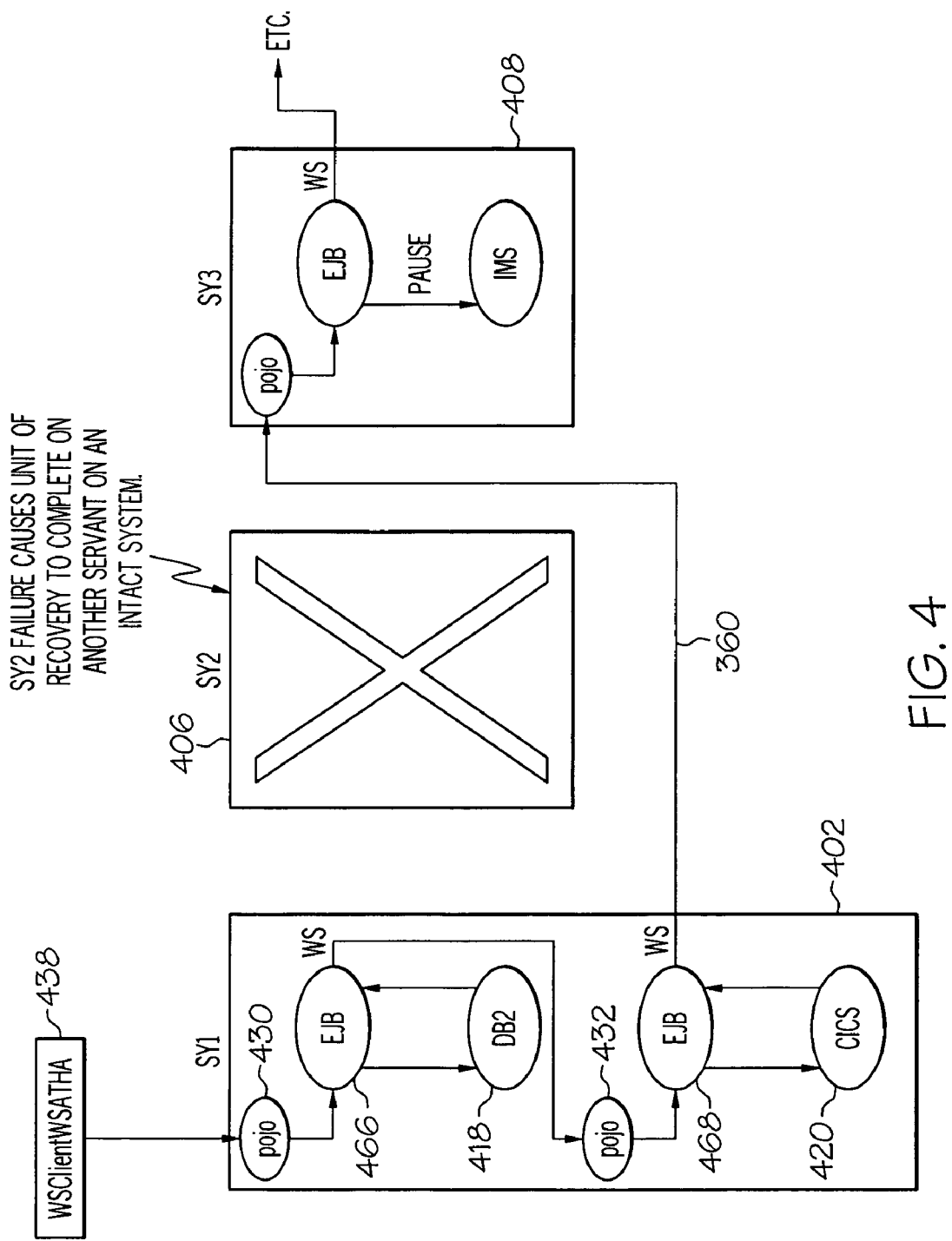
FIG. 4 is a transaction flow illustrating an error recovery procedure for a two-phase process according to one embodiment of the present invention.
Figure 5:
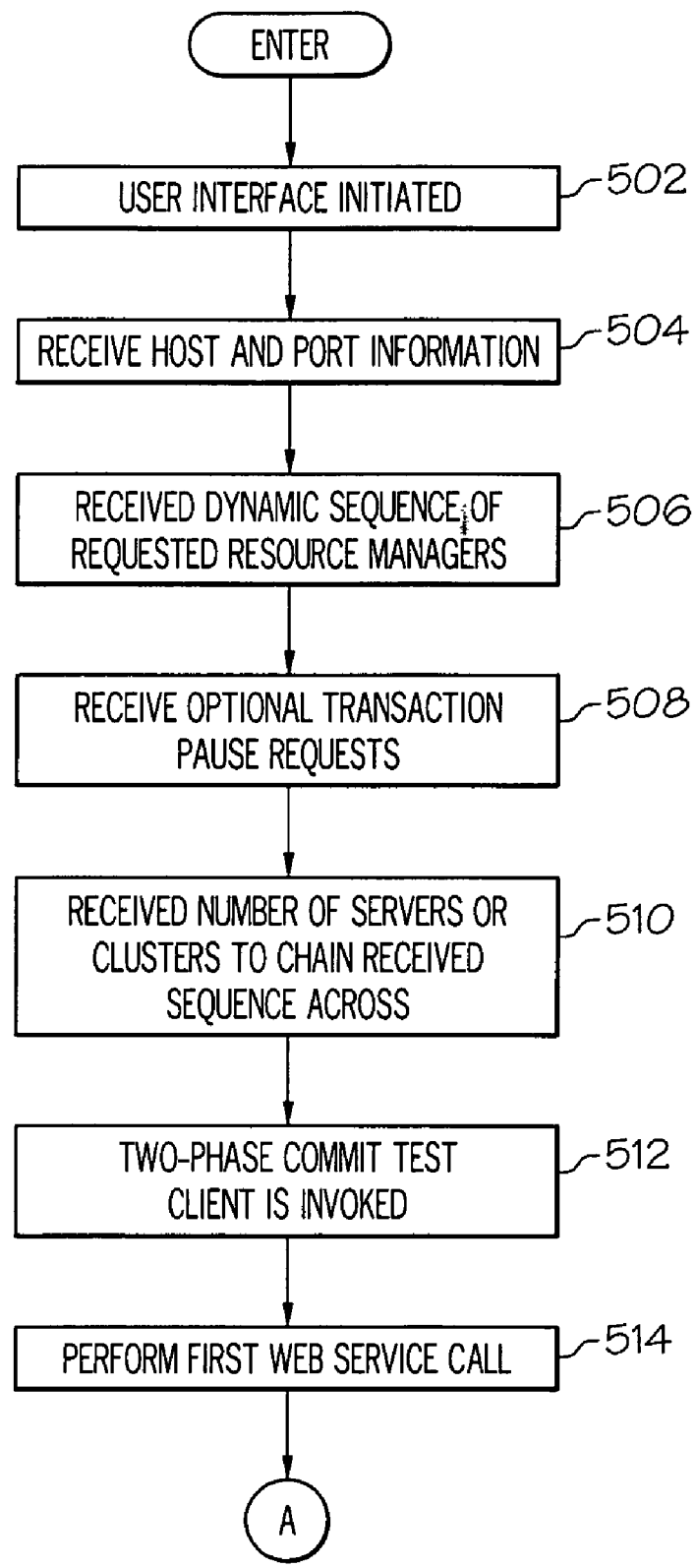
FIGS. 5-8 are operational flow diagrams illustrating a process for validating two-phase commit processes according to one embodiment of the present invention.

The error recovery procedure is shown in more detail in FIG. 4. In this example, the user interface/web service client 438 calls a web service 430 on System 1 402 that calls an EJB 466 that calls its respective resource manager 418. The EJB performs its business logic and proceeds to initiate the next transaction by calling the next web service 432 on System 2 406. This web service 432 calls its EJB 468, which in turn calls its resource manager 420 and performs the requested service. During the process of this transaction, System 2 406 goes down and the transaction becomes a Unit of Recovery ("UOR") and the UOR is shifted to another intact system for recovery. In this example, the UOR is completed on System 1 402. All the application servers are registered to a workload manager for HighAvailability. When a system does down, another intact system is chosen by the workload manager to handle the UOR. The next element enlisted in the global transaction then continues on System 3 408.

In one embodiment, there are two modes of recovery depending upon which subsystem detects an outage. When a peer restart and recovery manager detects a system outage, the unit of work becomes a unit of recovery and the manager shifts the unit of recovery to a servant that it initializes (on a still viable, functioning system) for the sole purpose of completing the unit of recovery, then the servant ends. If the HA recovery subsystem detects the outage, the unit of work is shifted to another existing server instance in the cluster.

Returning to FIG. 3, after the pause 372, the transaction resumes (e.g., a restart processes is performed) to completion the EJB 368 becomes a web service client and calls the next web service 334. This process continues until reaching the end of the sequence submitted by the user. The restart process, in one embodiment, is performed by a separate application/tool that targets the paused application thread in the target server and resumes its execution from the paused state.

The validation data from each transaction hop can then be analyzed by the test manager 140 to determine whether all transactions within the global transaction ran successfully or whether proper rollback procedures were performed. The results of the two-phase commit test are then displayed.

Accordingly, the two-phased commit testing system of the present invention allows various heterogeneous resource managers to be enlisted in a global transaction comprising chained superior-subordinate requests across multiple JAX-WS web service calls. The call chaining can occur across Remote Method Invocation over Internet Inter-Orb Protocol ("RMI/IIOP") calls between EJBs in a server as client configuration. The global transaction comprising these various chaining calls can be tested across various systems to ensure that they run successfully or that recovery operations are properly performed. In preferred embodiments, the user can dynamically configure combinations and sequences of chaining requests for the various resource managers, and can implement a pause function within a test sequence for enabling precise failover testing to be performed.

Operational Flow for Two-Phase Commit Testing

FIGS. 5-8 are operational flow diagrams illustrating a process for validating two-phase commit processes. A user, at step 502, initiates the user interface 138 of the two-phase commit test module 104. For example, a user loads a web interface comprising the user interface. The two-phase commit test module 104, at step 504, receives host and port information entered by the user. The two-phase commit test module 104, at step 506, receives a dynamic sequence of requested resource managers from the user. At step 508, transaction pause requests are optionally received. The two-phase commit test module 104, at step 510, receives the number of servers or clusters to chain the received sequence across.

Figure 6:
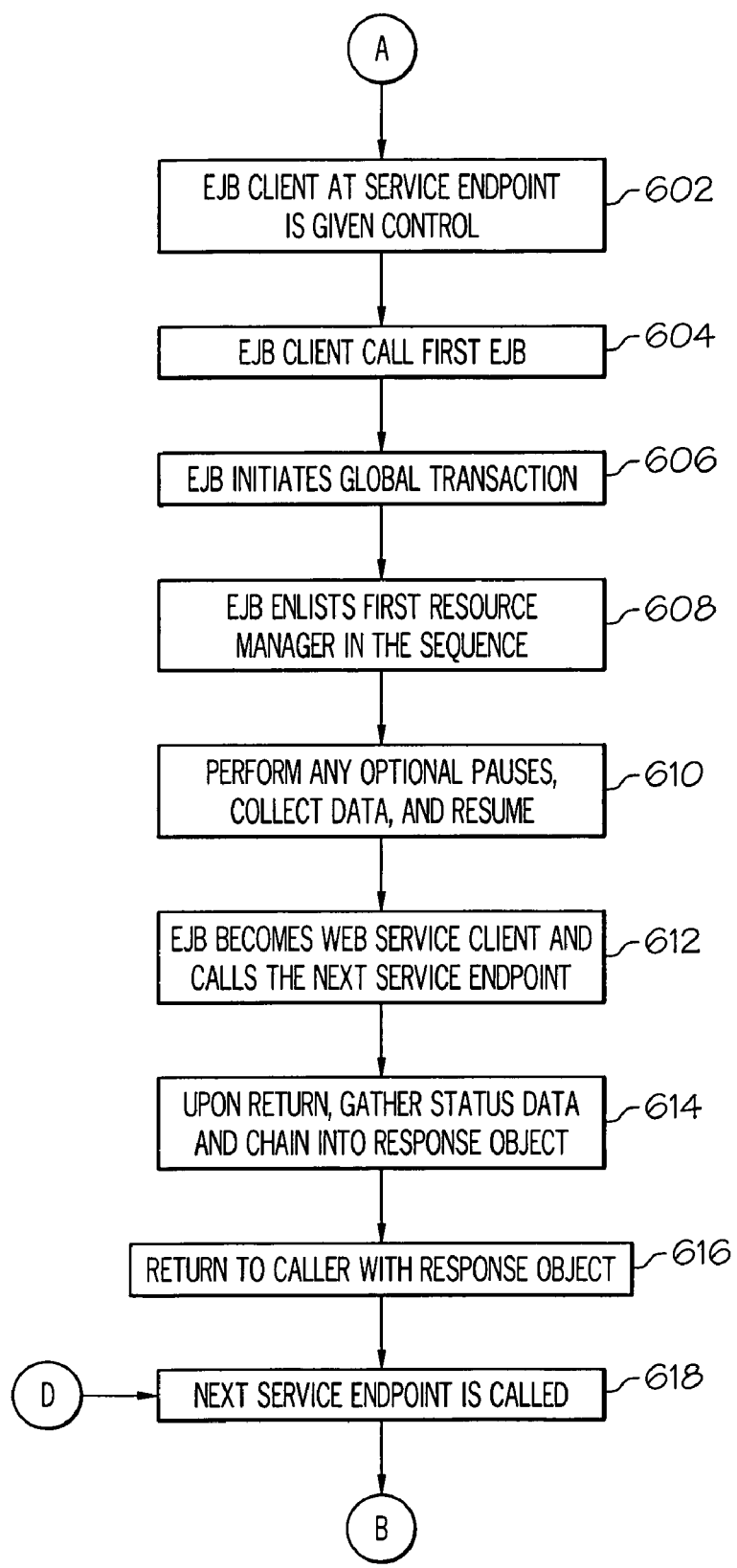
Figure 7:
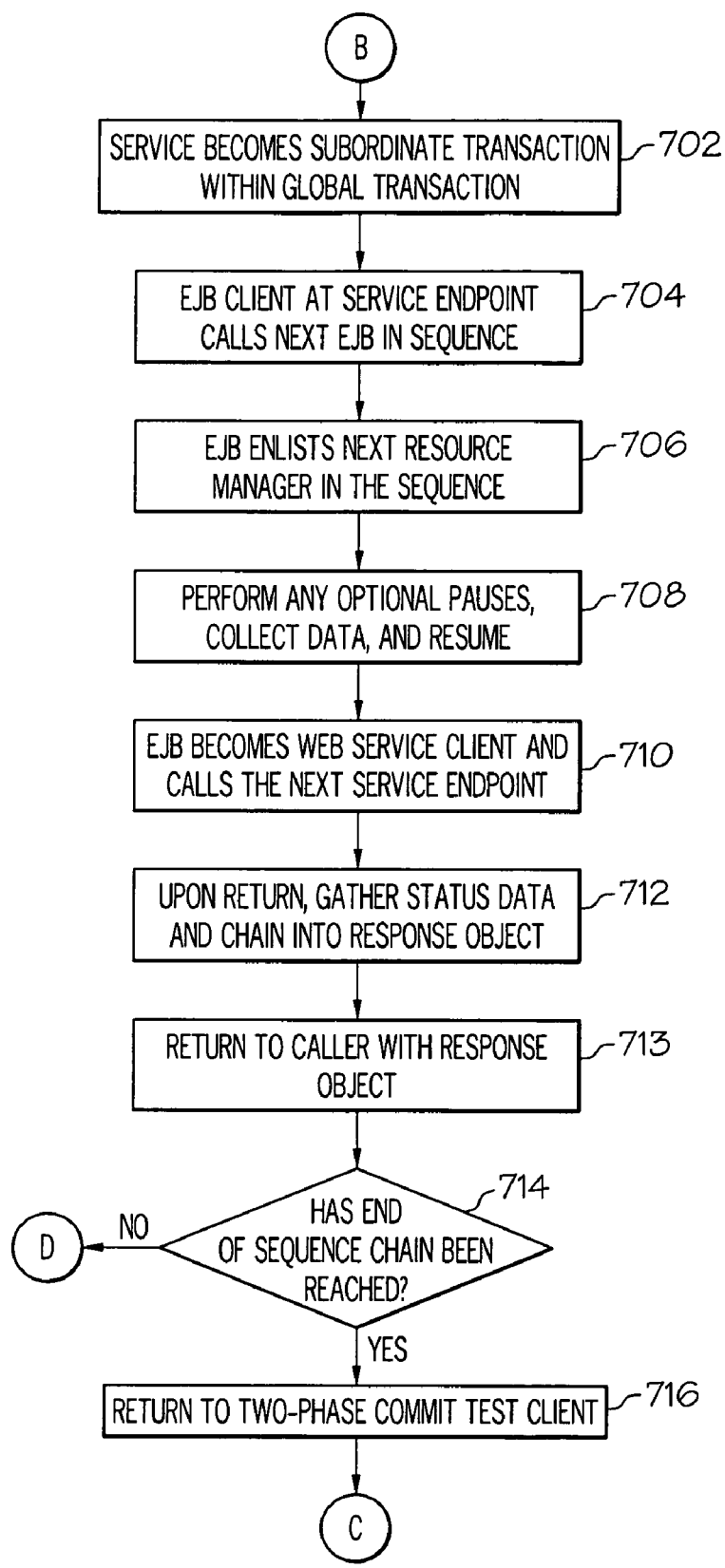

The two-phase commit test module 104, at step 512, is invoked with the data submitted by the user. The two-phase commit test module 104, at step 514, performs the first web service based on the data entered by the user. In particular, the two-phase commit test module 104, when invoked, acts as a web service client to invoke the first web service call. The control then flows to step 602 of FIG. 6. Turning now to FIG. 6, at step 602, the EJB client 330 at the service endpoint is given control of the transaction process. The EJB client 330, at step 604, calls the first EJB 366.

The EJB 366, at step 606, initiates the global transaction. The EJB 366, at step 608, enlists the first resource manager 118 in the sequence given by the user. If any pause request exists for this transaction, it is performed at step 610. If so, data associated with the paused transaction is collected at step 610 and then the processing is resumed. As discussed above, the pause transaction allows a failure to be tested to determine if recovery operations perform successfully. The EJB 366, at step 612, becomes a web service client. Upon return/completion of the transaction, status data, at step 614, is collected and chained into a response object. As discussed above, this status data reflects whether or not the two-phase commit process (e.g., prepare/commit or recovery) was successful for that particular transaction. The response object, at step 616, is returned to the caller, which is the two-phase commit test module 104 in this example. At step 618, the next service endpoint 332 is then called. The control then flows to step 702 of FIG. 7.

At step 702, the web service associated with the next transaction becomes a subordinate transaction within the global transaction. The EJB client (service endpoint) 332, at step 704, class the next EJB 368 in the sequence. The EJB 368, at step 706, enlists the next resource manager 320 in the sequence given by the user. If any pause request exists for this transaction, it is performed at step 708. Any data associated with the paused transaction is also collected at step 708 and the process is resumed. The EJB 368, at step 710, becomes a web service client. Upon return/completion of the transaction, status data, at step 712, is collected and chained into a response object. The response object, at step 713, is returned to the caller, which is the two-phase commit test module 104 in this example.

At step 714, the EJB 368 determines if the end of the sequence chain has been reached. If the result of this determination is negative, the control flows to step 618 of FIG. 6. If the result of this determination is positive, a return call is issued to the two-phase commit test client 104, at step 716. In this embodiment, the Test Client is returned to by way of the return at 616. The caller is returned to after calling the next service in the chain. That is, the tool keeps chaining services, and when it reaches the last service in the chain, it recurses back through the chain returning to the callers, and the returns start happening after reaching the end of the chain. The Two Phase commit test client is retuned to by returning from the original first (e.g., Service 1 calls Service 2, which calls Service 3, which calls Service 4, and then Service 4 returns to Service 3, which returns to Service 2, which returns to Service 1, which returns to the test client).

Figure 8:
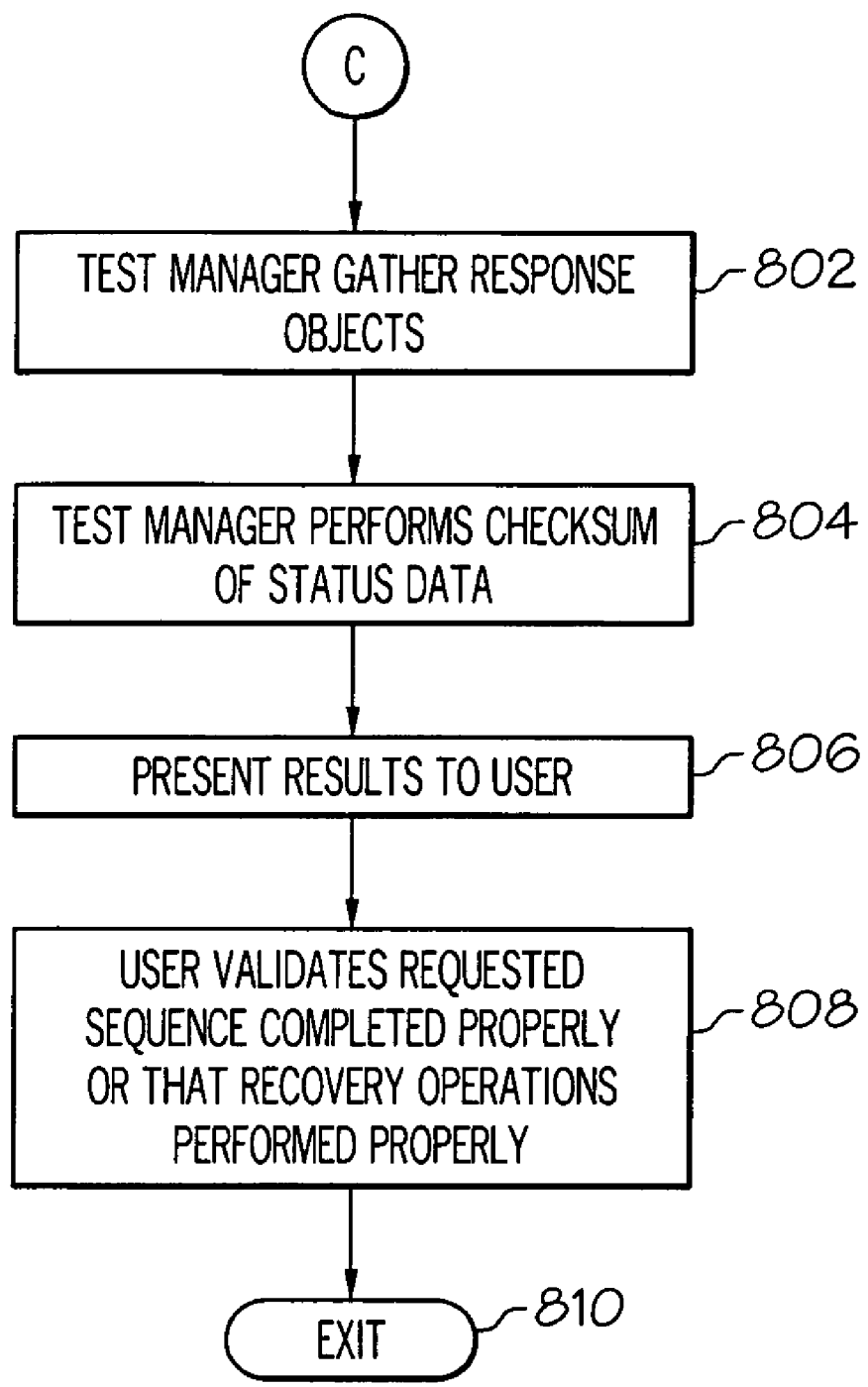

The control then flows to step 802 of FIG. 8. The test manager 140, at step 802, gathers the response objects created after each transaction of the global transaction. The test manager 140, at step 804, analyzes the status data of the response objects and presents the results to the user at step 806. The user (or an automated system in further embodiments), at step 808, validates that the requested sequence completed successfully or that a recovery operation was performed properly. The control flow then exits at step 810.

Detailed View of an Information Processing System

Figure 9:
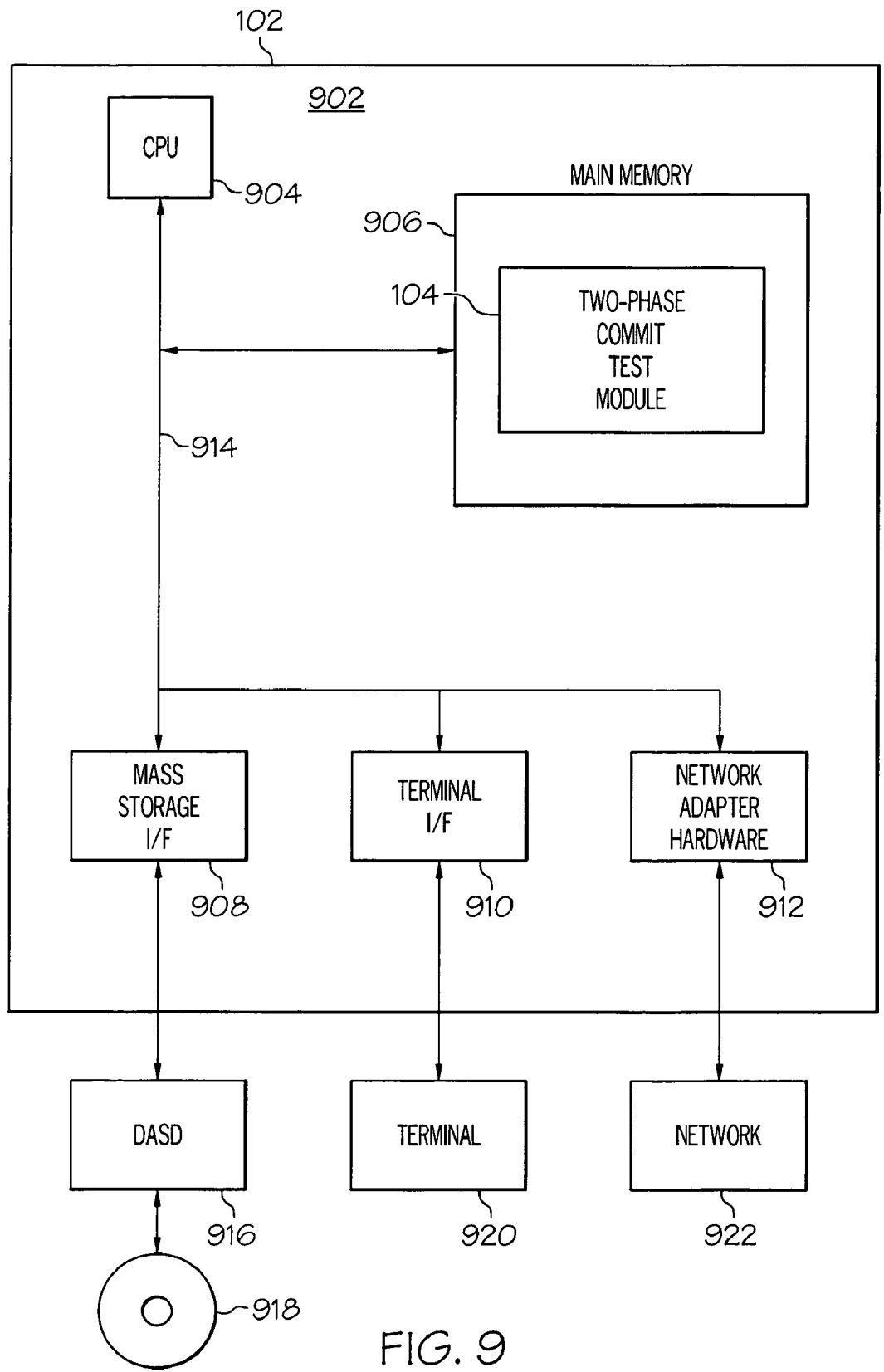
FIG. 9 is a block diagram illustrating an information processing system according to one embodiment of the present invention.

FIG. 9 is a block diagram illustrating an information processing system 102 according to an embodiment of the present invention. The information processing system is based upon a suitably configured processing system adapted to implement an embodiment of the present invention. Any suitably configured processing system is similarly able to be used as the information processing system 102 in embodiments of the present invention, such as a personal computer, workstation, or the like.

The information processing system 102 includes a computer 902. The computer 902 has a processor 904 that is connected to a main memory 906, mass storage interface 908, terminal interface 910, and network adapter hardware 912. A system bus 914 interconnects these system components. The mass storage interface 908 is used to connect mass storage devices, such as data storage device 916, to the information processing system 102. One example of a data storage device is a computer readable medium such as a disk drive, which may be used to store data to and read data from a CD 918 or a floppy diskette (not shown). Another type of data storage device is a hard disk drive storage device configured to support, for example, NTFS type file system operations.

The main memory 906, in this exemplary embodiment, comprises the two-phase commit test module 104 and its components. Although illustrated as concurrently resident in the main memory 906, respective components of the main memory 906 are not required to be completely resident in the main memory 906 at all times or even at the same time. In this embodiment, the information processing system 102 utilizes conventional virtual addressing mechanisms to allow programs to behave as if they have access to a large, single storage entity, referred to herein as a computer system memory, instead of access to multiple, smaller storage entities such as the main memory 906 and data storage device 916. The term "computer system memory" generically refers to the entire virtual memory of the information processing system 102.

Although only one CPU 904 is illustrated for computer 902, computer systems with multiple CPUs can be used equally effectively. This embodiment of the present invention further incorporates interfaces that each includes separate, fully programmed microprocessors that are used to off-load processing from the CPU 904. Terminal interface 910 is used to directly connect one or more terminals 920 to computer 902 to provide a user interface to the computer 902. These terminals 920, which are able to be non-intelligent or fully programmable workstations, are used to allow system administrators and users to communicate with the information processing system 102. The terminal 920 is also able to be a user interface and peripheral devices that are connected to computer 902 and controlled by terminal interface hardware included in the terminal I/F 910 that includes video adapters and interfaces for keyboards, pointing devices, and the like.

An operating system included in the main memory is a suitable multitasking operating system such as the IBM z/OS, Linux, UNIX, Windows XP, or Windows Server 2001 operating system. Further embodiments of the present invention are able to use any other suitable operating system. Some embodiments of the present invention utilize architectures, such as an object oriented framework mechanism, that allows instructions of the components of operating system to be executed on any processor located within the information processing system 102. The network adapter hardware 912 is used to provide an interface to a network 136. Embodiments of the present invention are able to be adapted to work with any data communications connections including present day analog and/or digital techniques or via a future networking mechanism.

Although the exemplary embodiments of the present invention are described in the context of a fully functional computer system, further embodiments are capable of being distributed as a program product, for example via CD or DVD, CD-ROM, or other form of recordable media.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A computer-implemented method for validating a two-phase commit process, the method comprising the steps of:
   receiving first information indicating a plurality of web services to be tested, each of the web services being associated with a different resource manager;
   receiving second information indicating a plurality of application servers for performing the web services;
   providing an option to select a sequence of web services to be called within the global transaction;
   creating a global transaction comprising a plurality of transactions based on the first information that was received;
   initiating within a testing environment, at one of the application servers, a two-phase commit process for performing the global transaction, the global transaction having an option to pause the two-phase commit process, the testing environment testing whether the two-phase commit process performs properly; and
   after the two-phase commit process has ended, displaying results of the global transaction that include information regarding each of the transactions within the global transaction.

2. The method of claim 1, wherein the second information comprises information for identifying a plurality of port numbers, each of the port numbers being associated with one of the application servers.

3. The method of claim 2, wherein the information for identifying a plurality of port numbers comprises a starting port number and the number of sequentially numbered ports.

4. The method of claim 1, further comprising the steps of:
   receiving a pause request associated with at least one of the web services; and
   temporarily pausing the two-phase commit process during the at least one web service.

5. The method of claim 1, further comprising the step of:
   receiving status data associated with each of the transactions in the global transaction from the application server performing the web service after the transaction has completed at the application server, the status data indicating whether a commit phase of the two-phase commit process was successful at the application server and/or whether a recovery phase of the two-phase commit process was successful at the application server.

6. The method of claim 5, further comprising the step of performing a checksum operation on the status data to validate whether or not the transaction completed successfully.

7. The method of claim 1, wherein the initiating step comprises the sub-steps of:

performing a first web service call for a first of the web services to be tested at a first of the application servers;

initiating, through a web service endpoint at the first of the application servers, the web service;

initiating a resource manager associated with the first of the web services;

performing, by the first of the web services, at least one operation with resources received from the resource manager; and calling a service endpoint associated with a subsequent web service in the web services to be tested.

8. The method of claim 7,
wherein the sub-step of initiating the resource manager comprises:
  calling, by the first of the web services, an Application Programming Interface; and
  initiating, by the Application Programming Interface, the resource manager associated with the first of the web services, and
wherein the sub-step of calling the service endpoint comprises calling, by the Application Programming Interface, the service endpoint associated with the subsequent web service.

9. An information processing system for validating a two-phase commit process, the information processing system comprising:
  a memory;
  a processor communicatively coupled to the memory; and
  a test module communicatively coupled to the memory and the processor, wherein the test module is adapted to:
    receive first information indicating a plurality of web services to be tested, each of the web services being associated with a different resource manager;
    receive second information indicating a plurality of application servers for performing the web services;
    provide an option to select a sequence of web services to be called within the global transaction;
    create a global transaction comprising a plurality of transactions based on the first information that was received;
    initiate within a testing environment, at one of the application servers, a two-phase commit process for performing the global transaction, the global transaction having an option to pause the two-phase commit process, the testing environment testing whether the two-phase commit process performs properly; and
    after the two-phase commit process has ended, display results of the global transaction that include information regarding each of the transactions within the global transaction.

10. The information processing system of claim 9, wherein the second information comprises information for identifying a plurality of port numbers, each of the port numbers being associated with one of the application servers.

11. The information processing system of claim 9, wherein the test module is further adapted to:
  receive a pause request associated with at least one of the web services; and
  temporarily pause the two-phase commit process during the at least one web service.

12. The information processing system of claim 9, wherein the test module is further adapted to:
  receive status data associated with each of the transactions in the global transaction from the application server performing the web service after the transaction has completed at the application server, the status data indicating whether a commit phase of the two-phase commit process was successful at the application server and/or whether a recovery phase of the two-phase commit process was successful at the application server.

13. The information processing system of claim 9, wherein initiating, at one of the application servers, a two-phase commit process for performing the global transaction further comprises:
  performing a first web service call for a first of the web services to be tested at a first of the application servers;
  initiating, through a web service endpoint at the first of the application servers, the web service;
  initiating a resource manager associated with the first of the web services;
  performing, by the first of the web services, at least one operation with resources received from the resource manager; and
  calling a service endpoint associated with a subsequent web service in the web services to be tested.

14. The information processing system of claim 13, wherein the initiating a resource manager associated with the first of the web services further comprises:
  calling, by the first of the web services, an Application Programming Interface; and
  initiating, by the Application Programming Interface, the resource manager associated with the first of the web services, and
  wherein the test module is further adapted call the service endpoint comprises calling, by the Application Programming Interface, the service endpoint associated with the subsequent web service.

15. A non-transitory computer program storage product for validating a two-phase commit process, the computer program storage product comprising instructions for:
  receiving first information indicating a plurality of web services to be tested, each of the web services being associated with a different resource manager;
  receiving second information indicating a plurality of application servers for performing the web services;
  providing an option to select a sequence of web services to be called within the global transaction;
  creating a global transaction comprising a plurality of transactions based on the first information that was received;
  initiating within a testing environment, at one of the application servers, a two-phase commit process for performing the global transaction, the global transaction having an option to pause the two-phase commit process, the testing environment testing whether the two-phase commit process performs properly; and
  after the two-phase commit process has ended, displaying results of the global transaction that include information regarding each of the transactions within the global transaction.

16. The computer program storage product of claim 15, wherein the second information comprises information for identifying a plurality of port numbers, each of the port numbers being associated with one of the application servers.

17. The computer program storage product of claim 15, further comprising instructions for:
  receiving a pause request associated with at least one of the web services; and
  temporarily pausing the two-phase commit process during the at least one web service.

18. The computer program storage product of claim 15, further comprising instructions for:
  receiving status data associated with each of the transactions in the global transaction from the application server performing the web service after the transaction has completed at the application server, the status data indicating whether a commit phase of the two-phase commit process was successful at the application server and/or whether a recovery phase of the two-phase commit process was successful at the application server.

19. The computer program storage product of claim 15, wherein the instructions for initiating, at one of the application servers, a two-phase commit process for performing the global transaction further comprise instructions for:
   performing a first web service call for a first of the web services to be tested at a first of the application servers;
   initiating, through a web service endpoint at the first of the application servers, the web service;
   initiating a resource manager associated with the first of the web services;
   performing, by the first of the web services, at least one operation with resources received from the resource manager; and
   calling a service endpoint associated with a subsequent web service in the web services to be tested.

20. The computer program storage product of claim 19, wherein the instructions for initiating a resource manager associated with the first of the web services further comprise instructions for:
   calling, by the first of the web services, an Application Programming Interface; and
   initiating, by the Application Programming Interface, the resource manager associated with the first of the web services, and
   wherein the test module is further adapted call the service endpoint comprises calling, by the Application Programming Interface, the service endpoint associated with the subsequent web service.

* * * * *